C. KELLEY.
COOLING APPARATUS FOR GAS ENGINES.
APPLICATION FILED OCT. 8, 1913.
1,160,291.
Patented Nov. 16, 1915.
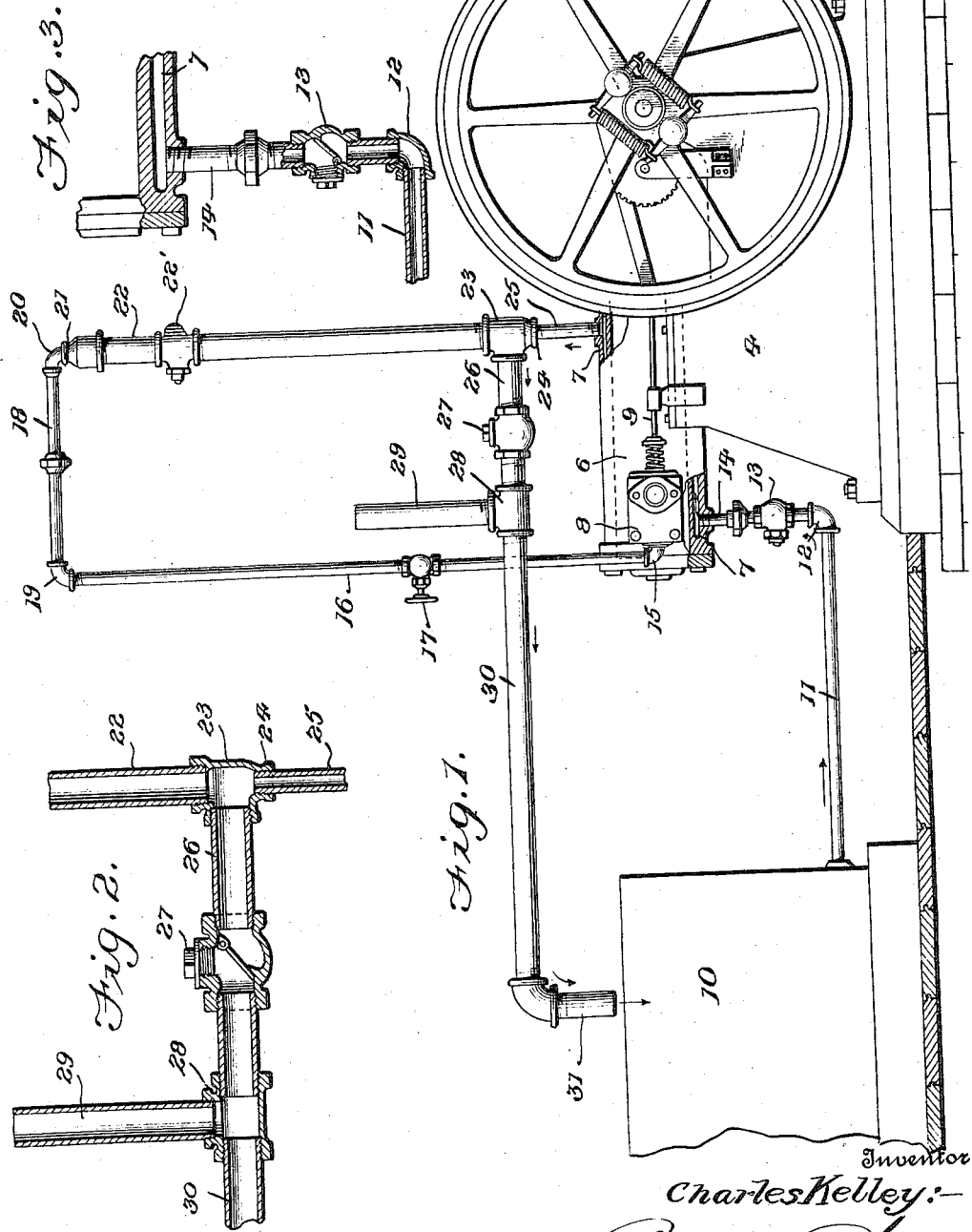

UNITED STATES PATENT OFFICE.

CHARLES KELLEY, OF BELLAIR, ILLINOIS, ASSIGNOR OF ONE-HALF TO H. E. PICKETT, OF BRAZIL, INDIANA.

COOLING APPARATUS FOR GAS-ENGINES.

1,160,291.     Specification of Letters Patent.     Patented Nov. 16, 1915.

Application filed October 8, 1913. Serial No. 794,018.

*To all whom it may concern:*

Be it known that I, CHARLES KELLEY, a citizen of the United States, residing at Bellair, in the county of Crawford and State of Illinois, have invented certain new and useful Improvements in Cooling Apparatus for Gas-Engines, of which the following is a specification.

My invention relates to new and useful improvements in cooling apparatus for gas engines, and more particularly to that class of gas engine coolers adapted to be installed in connection with stationary gas engines.

The object of this invention is to provide a gas engine cooler of the type described which shall obviate the necessity of the use of a pump to circulate the cooling water.

A further object of this invention is to provide a gas engine which may be easily installed and which shall be inexpensive to manufacture, operate and maintain.

A still further object of this invention is to provide a gas engine cooler which shall provide for effective circulation of the cooling water throughout the water jacket of the engine at all times when the engine is in operation.

With these and other objects in view this invention consists in the peculiar combination and construction of the various parts of a gas engine cooler as hereinafter described, and more particularly set forth in the appended claims.

Referring to the drawings wherein similar reference numerals indicate similar parts wherever used, Figure 1 is a vertical side elevation, partly broken away, showing a gas engine equipped with the improved engine cooler; Fig. 2 is a detail section of one of the valves controlling the flow of water; Fig. 3 is a detail sectional view of another of the valves controlling the water.

The numeral 4 designates a gas engine of any improved type, having the usual cylinder 6 provided with a water jacket 7, mixing chamber 8 containing the ordinary valve 9, operated in the usual manner. Located at any suitable distance from the gas engine is provided a tank 10 adapted to be filled with water or any suitable cooling liquid, and having attached thereto at its lower portion a pipe 11 having thereon an L 12 carrying a flap valve 13 and an extension 14, said extension 14 being in open connection with the under cylinder portion of the water jacket 7.

Connected to the mixing chamber 8 by means of an L 15 is a vertical pipe 16, provided with a hand valve 17, and having an angular pipe 18 fastened thereto by means of an L 19, said angular pipe 18 being in turn connected by means of an L 20 to a reducer 21 having in connection therewith a pipe 22 of larger diameter than the pipes 11, 16 or 18, said pipe carrying a flap valve 22' which is opened by suction in the chamber 8 and closed when said suction ceases. The pipe 22 in turn carries a T 23, having a reducer end 24 connected to a pipe 25 which communicates with the upper cylinder portion of the water jacket 7. Attached to the T 23 is a pipe 26, carrying a flap valve 27 and also a T 28, having attached thereto a vertical pipe 29 open to the air. Adjacent the T 26 is a long section of pipe 30 which extends over the water tank 10 and discharges into the same by means of an angle nozzle 31.

The operation of my device is as follows: Upon the intake stroke of the engine 4 a suction is formed in the mixing chamber 8, which suction in turn is transmitted through the pipes 16, 18 and 22, and by means of the pipe 25 serves to lift a column of water upwardly into the pipe 22 from the water chamber 7. This suction causes the valve 27 to remain in closed position, and also serves to open the valve 13 which allows water from the tank 10 to pass through the pipes 11 and 14 upwardly into the under cylinder portion of the water jacket 7. The pipe 22 being of larger diameter than the rest of the pipes the column of water therein is so heavy that the suction does not lift the said column much higher than the T 23. The intake stroke having been completed the suction within the chamber 8 and pipes 16, 18, 22 and 25 ceases. The valve 13 closes and the column of water within the pipe 22 no longer held in a vertical position by means of the suction falls back downwardly and out through the pipe 26, opening the valve 27, thence through the pipe 30 and the nozzle 31 into the tank 10.

The fresh charge of water which has come into the cylinder jacket by means of the pipe 14 fills the water jacket and prevents the return thereto of the column of water within the pipe 22. It will thus be seen that an effectual cooling of the engine cylinder is maintained as a certain amount of fresh water enters the water jacket upon every intake stroke of the engine piston.

Considerable variation of the details of this invention may be resorted to without departing from the spirit thereof, and it is not my intention to confine myself to the specific form shown herein, but to construe the appended claims as broadly as permissible in view of the prior art.

Having described my invention what I claim as new and desire to secure by Letters Patent is:

1. In an engine cooling apparatus the combination with a cylinder and mixing chamber, of a water jacket for the cylinder, a source of water supply therefor, a direct connection between the water jacket and the source of water supply at one side of said cylinder and a direct elevated connection between the water jacket at the other side of said cylinder and the mixing chamber whereby on the intake of the cylinder water will be drawn out of the water jacket on one side of the cylinder and allowed to flow directly into the cylinder at the other side.

2. An engine cooler comprising in combination a cylinder, a water jacket therefor, a mixing chamber, a pipe of relatively small diameter connected to said mixing chamber, a pipe of relatively larger diameter connected to said pipe, a connection between said relatively larger pipe and the water jacket, a water tank, a supply pipe from said water tank and connected to said water jacket, a valve controlling said pipe, and a discharge pipe from said pipe of relatively larger diameter whereby suction in said mixing chamber will slightly raise a column of water in the said large pipe and admit a supply of water from said supply pipe, and upon a cessation of said suction will cause said column of water that was withdrawn from said water jacket to be discharged into said tank.

In testimony whereof I affix my signature in presence of two witnesses.

CHARLES KELLEY.

Witnesses:
    CHAS. L. MARKLEY,
    CLYDIA SUTHERLAND.